July 31, 1956 W. H. McCORKLE 2,756,857
POSITIONING DEVICE
Filed May 16, 1951 3 Sheets-Sheet 1
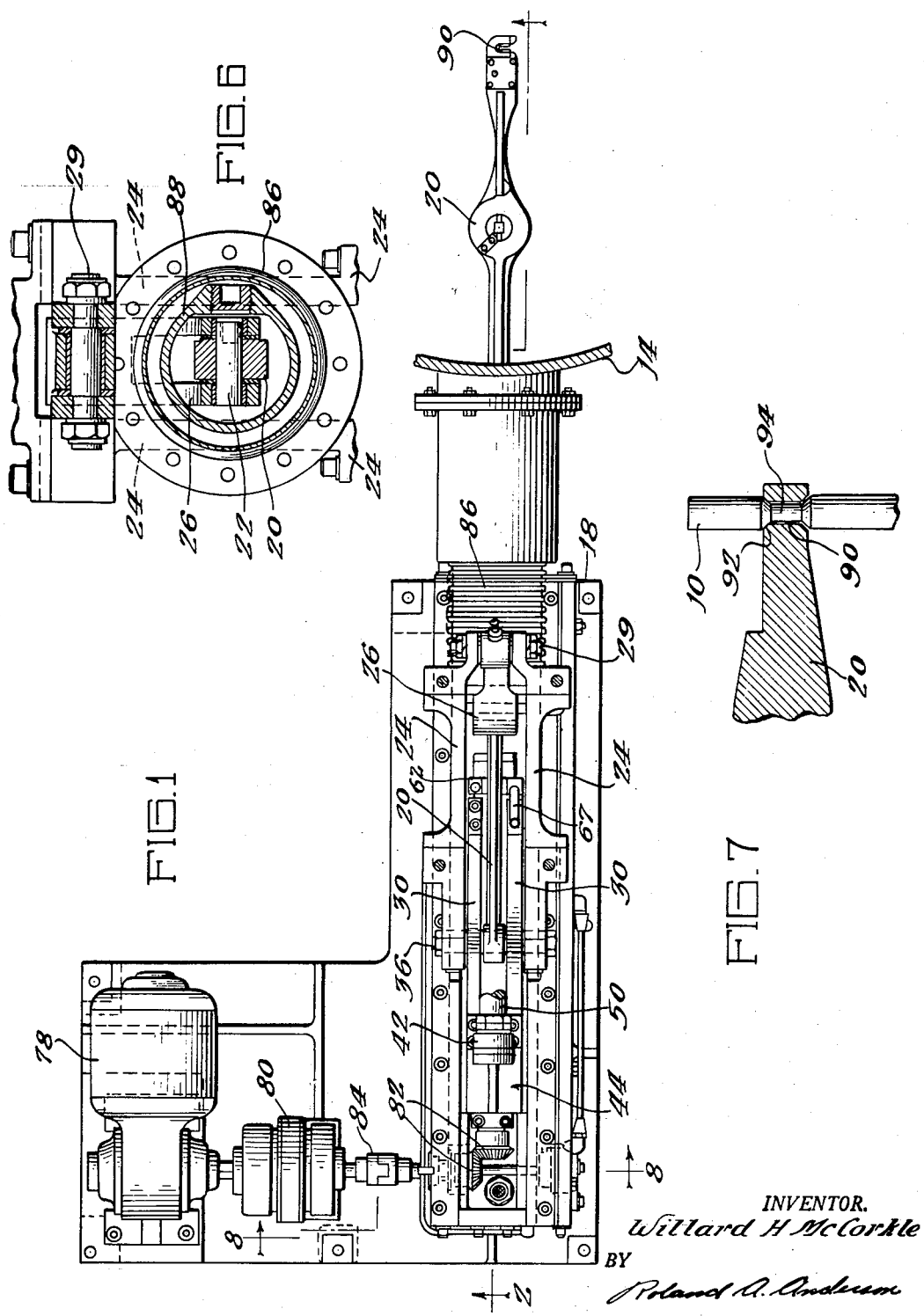
INVENTOR.
Willard H. McCorkle
BY
Roland A. Anderson
Attorney.

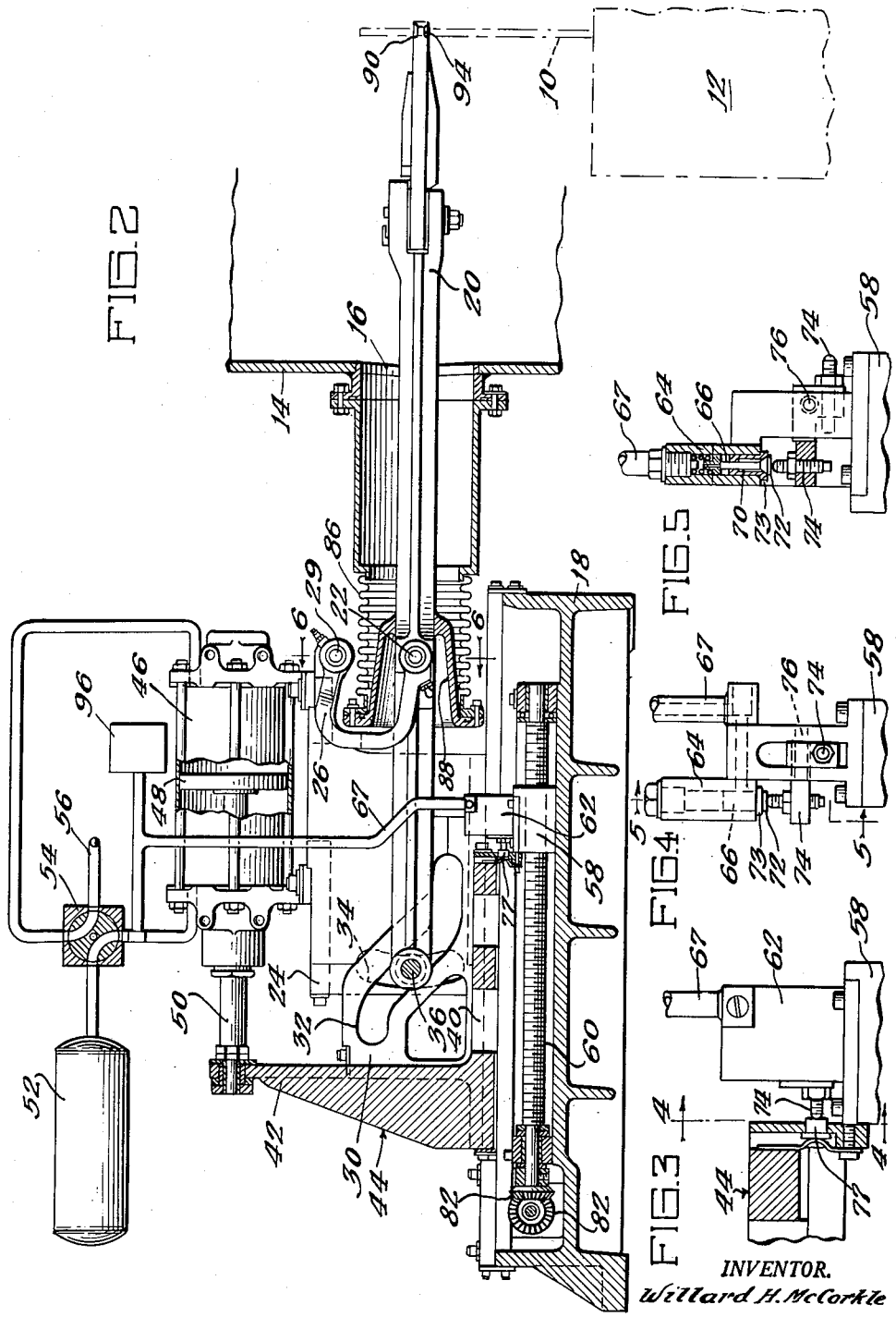

July 31, 1956 W. H. McCORKLE 2,756,857
POSITIONING DEVICE

Filed May 16, 1951 3 Sheets-Sheet 3

INVENTOR.
Willard H. McCorkle
BY
Roland A. Anderson
Attorney.

United States Patent Office 2,756,857
Patented July 31, 1956

2,756,857
POSITIONING DEVICE

Willard H. McCorkle, Chicago, Ill., assignor to the United States of America as represented by the United States Atomic Energy Commission Application May 16, 1951, Serial No. 226,616

8 Claims. (Cl. 192—150)

The present invention relates generally to a device for imparting linear motion to an object, and specifically the invention relates to a device for positioning a control element within a neutronic reactor.

Neutronic reactors are generally controlled by moving a control element within the reactor to maintain the neutron flux density in the active portion of the reactor within predetermined limits. The element used to control the reaction may contain absorber material, a fuel material, or moderator material, depending upon the particular design features of the reactor. A more complete description of the problems of controlling nuclear reactions and their solutions appears in the application of Enrico Fermi and Leo Szilard, entitled "Chain Reactions," Serial No. 568,904, filed December 19, 1944, now Patent No. 2,708,656.

In order to provide adequate control of the nuclear reaction within a chain reactor, it must be possible to accurately position the control element within the active portion of the reactor. If the control element is one of the fuel elements of the reactor, the mechanical device positioning the element within the reactor must also be capable of rapidly removing the element from the active portion of the reactor at any time that an emergency requires the shutting down of the neutronic reaction in the reactor. Devices commonly in use for positioning an object provide a mechanical linkage between the object and the operator which will permit motion of the object at a slow rate of speed, so that the object may be accurately positioned, but the mechanical linkage in such devices generally prevents rapid motion of the object in the opposite direction. It is one of the objects of the present invention to provide a device which will make possible the accurate positioning of an object, and still permit the object to be rapidly moved from that position.

Most of the neutronic reactors to date that are controlled by means of rods require linear motion of the control elements. For this reason, it is an object of this invention to provide a control mechnism which will linearly position an object.

In order to position an object with the accuracy required in positioning a control element in a neutronic reactor, it has generally been thought that a direct drive mechanical linkage is required. Direct drive mechanical linkages provide a direct and a positive drive upon the object, that is, a fixed ratio of the power applied to the driven end of the linkage must necessarily be produced at the driving end of the linkage. If for some reason, the object is unable to move, such direct drive mechanical linkages place stresses and strains upon both the object and the mechanical structure of the linkage. A linkage of this type could easily wedge a rod control element in a neutronic reactor if an obstruction appeared between the reactor and the control element, and wedging the rod control element in this manner could easily mean loss of control of the neutronic reaction. The problem becomes quite serious when it is considered that deformation of neutronic reactor structures often occurs under prolonged use at high neutron flux densities. For this reason, it is a further object of the invention to provide a positioning mechanism that will minimize the danger of a control element becoming immovable as a result of obstructions in its path.

Other objects and advantages of the present invention will become apparent from a further reading of the specification and claims. The invention may be more clearly understood when viewed in the light of the drawings, of which:

Figure 1 is a plan view of one embodiment of the invention, the air chamber having been removed;

Figure 2 is a sectional view of this embodiment of the invention taken along line 2—2 of Figure 1; portions of the view being schematic and other portions being in elevation;

Figure 3 is an enlarged fragmentary view of a portion of Figure 2, partly in section and partly in elevation;

Figure 4 is a sectional view taken along line 4—4 of the enlarged fragmentary view shown in Figure 3;

Figure 5 is a sectional view taken along line 5—5 of Figure 4;

Figure 6 is a sectional view taken along line 6—6 of Figure 2;

Figure 7 is an enlarged fragmentary view of Figure 2 partly in section and partly in elevation showing the control element connected to the device.

Figure 8:
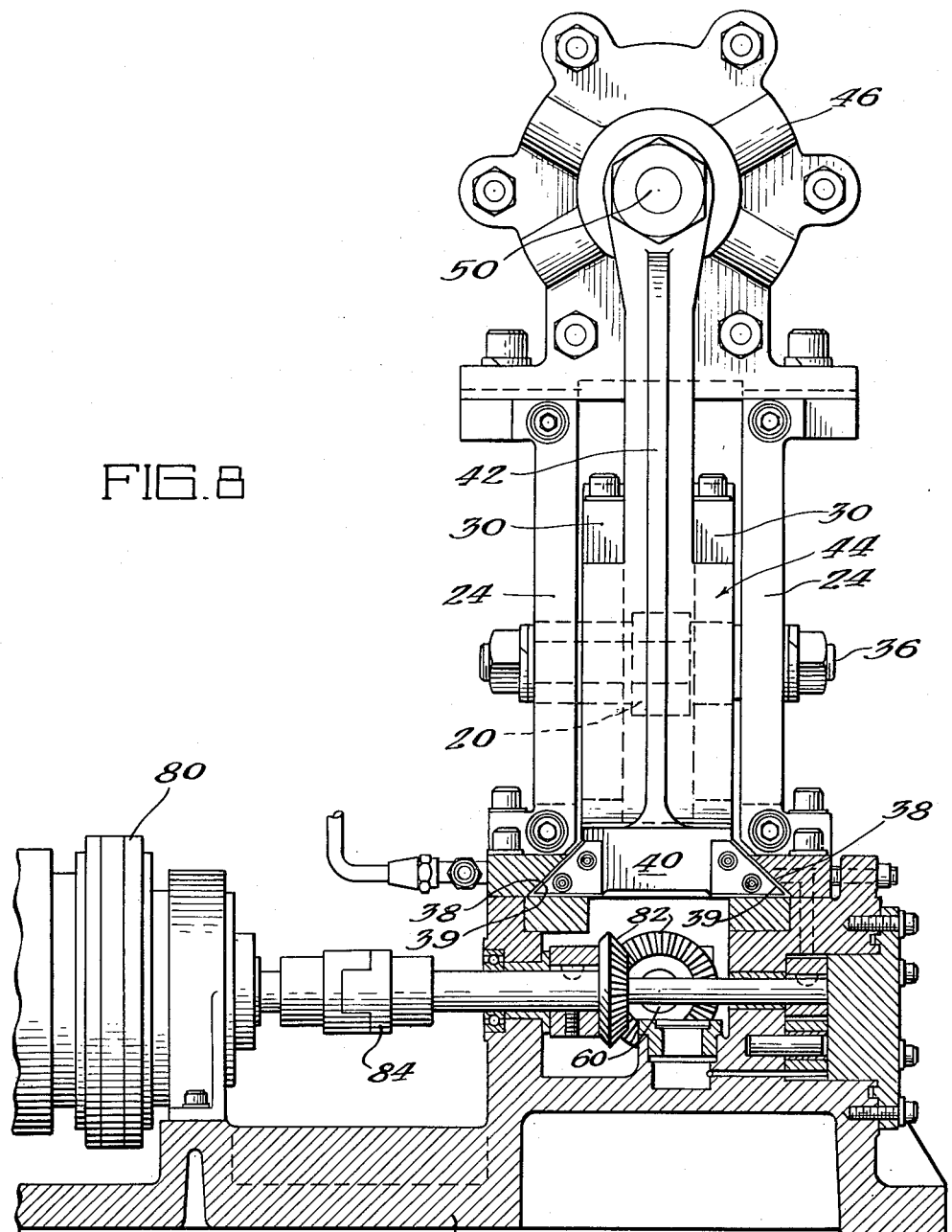
Figure 8 is a sectional view of the device taken along line 8—8 of Figure 1.

While the present positioning device has many utilities, it is particularly adapted to position a rod fuel element 10 in a neutronic reactor 12, as illustrated in Figure 2. Figures 1 and 2 also fragmentarily show a portion of a wall 14 of a gas sealing chamber which is generally used to completely enclose the neutronic reactor 12, and prevents the escape of radioactive gases from the reactor into the ambient atmosphere. The positioning device operates through an orifice 16 in the wall 14.

Motion is imparted to the fuel element 10 by means of a rocker arm 20 which is pivotally mounted to a base 18. A pair of supporting members 24 are mounted to the base 18 parallel to each other and to the rocker arm 20, and these members support the rocker arm 20 at its pivot point by means of a horseshoe carriage 26. One end of the carriage 26 is pivotally connected to the rocker arm 20 by a pin 22, and the other end thereof pivotally mounted to the adjacent end of the support members 24 by means of a carriage pin 29 mounted between the support members 24. In this manner, the rocker arm pivot pin 22 is movable in an arc about the carriage pivot pin 29.

The base 18 also slidably supports a pair of parallel slides 30 which are disposed between the pair of supporting members 24, the rocker arm 20 being disposed between the two slides 30. The pair of support members 24, the two slides 30, and the rocker arm 20 are all mounted closely together, leaving only sufficient room for clearance between each other.

The slides 30 are provided with congruent races 32 in the shape of an elongated S, as illustrated in Figure 2, the ends of the races 32 being parallel to the portion of the base 18 upon which the slides are supported, and the end of the races nearest to the pivot pin 22 being nearest to the base 18. The supporting members 24 are also provided with slightly curved congruent slots 34 which are generally oriented in a direction normal to the surface of the base 18 upon which the slides 30 are disposed. A shaft 36 is disposed through the race 32 in the slides 30 and the slots 34 in the support members 24, so that it will travel along both the races 32 and the slots 34 when the slides 30 are moved along the base 18.

The upper surface of the base 18 is provided with a pair of V-shaped tracks 38 in which the slides 30 are keyed. The two slides 30 have a common slide base 40 which is provided with two wedge-shaped tongues 39 which are in register with the tracks 38. The slides 30, the slide base 40, and a driving arm 42, which is attached to the base 40 and the slides 30 at their ends farthest from the pivot pin 22, may be termed a slide assembly 44. The assembly 44 is free to travel the full length of the base 18 upon the tracks 38.

The exact shape of the races 32 in the slides 30 is not critical, except that the distance between the opposite ends of the races measured normal to the base 18 must be sufficient to provide adequate motion at the driving end of the rocker arm 20. The shape of the slots 34, however, is quite critical, since it is the shape of the slots 34 that provides the linear motion of the driving end of the rocker arm 20. If it is considered that the pivot pin 22 is movable only in a line parallel to the tracks 38, which is approximately true in cases where the rocker arm 20 is moved through a relatively small angle, the shape of the slot 34 will be a portion of an ellipse having the equation $$\frac{x^2}{L^2}+\frac{y^2}{(L_1)^2}=1$$

where $x$ is the ordinate, $y$ is the abscissa, L is the total length of the rocker arm 20, and $L_1$ is the distance between the pivot pin 22 and the shaft 36. It is thus clear, that the major axis of the ellipse is equal to twice the length of the rocker arm 20, the major axis running along the rocker arm 20 when the shaft 36 is in the center of the slot 34, and the minor axis of the ellipse is equal to twice the distance between the pivot pin 22 and the shaft 36.

A cylinder 46 is also mounted to the support members 24 above the slides 30, and is provided with a sliding piston 48. The piston 48 is connected to the arm 42 of the slide assembly 44 by a piston rod 50, the axis of the rod 50 running parallel to the tracks 38. An air tank 52, shown schematically in Figure 2, is connected to both ends of the cylinder 46 through a two-position valve 54. In one position of the valve 54, the air tank 52 is connected to the one end of the cylinder 46, and the other end of the cylinder 46 is connected to the ambient atmosphere through the vent 56; and in the other position of the valve 54, the connections to the two portions of the cylinder 46 are reversed. Thus, the piston 48 may be moved in either direction by applying air pressure from the tank 52 to the desired end of the cylinder 46.

The slide assembly 44 is free to be driven away from the pivot pin 22 by the air pressure, but it is not free to be driven toward the pivot pin 22 by the air pressure, because of a travelling nut 58 that is mounted upon a screw 60. The travelling nut 58 is provided with a flat surface which is slidably disposed with relation to the base 18, and hence the nut 58 is unable to rotate about the screw 60 and travels along the screw 60 when the screw 60 is rotated. An air release valve 62 is secured to the travelling nut 58, and is connected to one end of the cylinder 46.

The air release valve 62 is shown in detail in Figures 3 through 5. A valve stem 66 is journaled within a chamber 70 in a housing 64. Tubing 67 connects one end of the chamber 70 to the cylinder 46. The valve stem 66 protrudes from the other end of the chamber 70 and is provided with a valve head 72 which is provided with a seat 73 attached to the housing 64. A crank-shaped member 74 is pivoted on a pin 76 which is mounted on the housing 64, and the end of the member 74 engages the valve head 72 and forces it to seat. The other end of the crank-shaped member 74 is positioned to contact a spring loaded stop 77 mounted on the slide assembly 44.

Examination of Figure 2 indicates that the fuel element 10 will be withdrawn from the reactor when the slide assembly 44 is moved away from the pivot pin 22. Since withdrawing the fuel element 10 decreases the neutronic chain reaction within the reactor and reduces any possible danger of explosion, it is permissible and desirable that motion in this direction should be accomplished with the least possible delay. However, since there is danger present as a result of inserting the fuel element 10 into the reactor 12 too quickly, motion of the slide assembly 44 toward the pivot pin 22 must be carefully controlled. This is accomplished by means of the travelling nut 58 which is disposed in the path of the slide assembly 44 when the slide assembly 44 is moved toward the pivot pin 22, thus inserting the fuel element 10 further into the reactor 12. The fuel element 10 may only be further inserted into the reactor 12 by cranking the travelling nut 58 toward the pivot pin 22, and thus allowing the pressure in the cylinder 46 to drive the slide assembly 44 further in that direction.

However, occasionally mechanical movements do not perform smoothly, but jerk along their path. If the fuel rod 10 is inserted into the reactor 12 in this manner, there is danger that the reaction will get out of control, because the rod 10 may be moved too far into the reactor as a result of the last jerk. For this reason, the air release valve 62 has been connected to the side of the chamber which supplies the pressure to insert the fuel rod 10 further into the reactor 12, namely, the end of the chamber 46 adjacent to the arm 42 of the slide assembly 44. Since the pressure can only build up in this portion of the chamber 46 when the air release valve 62 is closed, force for moving the slide assembly 44 can only be obtained when the slide assembly 44 is abutting the adjacent end of crank-shaped member 74 of the release valve 62. If the travelling nut 58 leads the slide assembly 44 any appreciable distance, the air release valve 62 releases the pressure in the cylinder 46, and there will be no force capable of further inserting the fuel rod 10 into the reactor 12. In this manner, danger of mechanical damage to the reactor or the positioning device and loss of control of the neutronic reaction as a result of wedging a control rod within the reactor have been eliminated.

The screw 60 is rotated by means of a reversible motor 78 which is connected to the screw 60 through an electromagnetic clutch 80 and a pair of beveled gears 82. A flexible shaft coupling 84 between the electromagnetic clutch 80 and the beveled gears 82 makes allowance for small errors in the alignment of the rotating parts. The motor 78 is connected to a source of electrical power, not shown. A normally open pressure actuated switch 96 is connected to the air tubing 67, and may be used to break the power circuit to the motor 78 when the pressure is released from the cylinder 46. It is particularly advantageous to connect switch 96 into the circuit of the motor 78 used only to energize the motor in the direction to insert the fuel element 10 into the reactor 12, so that the fuel element 10 may be withdrawn from the reactor 12 under all conditions.

Since it is necessary to seal the orifice 16 in the wall 14 of the gas-tight chamber surrounding the reactor 12, a flexible bellows 86 is sealed about the orifice 16 and surrounds the rocker arm 20. A sealing cup 88 sealed to the rocker arm 20 is also sealed to the other end of the bellows 86 at its periphery. In this manner, motion of the rocker arm 20 may be transmitted to the fuel rod 10 of the reactor 12 without breaking the gas-tight seal which surrounds the reactor 12.

Since the rocker arm 20 will seldom be absolutely normal to the fuel element 10, it must be possible for the fuel element 10 to pivot relative to the rocker arm 20. this is accomplished by means of a socket 90 which connects the rod 10 to the rocker arm 20, and provides a loose fit between the rod 10 and the rocker arm 20.

The socket 90 is provided with sloped shoulders 92 which accommodate a groove 94 on the rod 10.

In order to further insert the fuel element 10 in the reactor 12, it is necessary to apply air pressure to the piston 48 in the cylinder 46, since this is the only means provided for moving the slide assembly 44. The air tank 52 is the source of this pressure, since it has either previously been charged with an adequate supply of air or is continuously being supplied with air by any of the well known means. To further insert the fuel element 10 into the reactor 12, the valve 54 is placed in the position for normal operation, as shown in Figure 2, which connects the air tank 52 to the end of the cylinder 46 adjacent to the driving arm 42 of the slide assembly 44. However, the air pressure will not be applied to the piston 46 in sufficient quantities to move the slide assembly 44 unless the air release valve 62 is in a closed position. This can only be accomplished by rotating the screw 60 in a direction which will move the travelling nut 58 and the air release valve 62 toward the slide assembly 44 and into contact with the crank-shaped member 74. In this manner, the air release valve 62 will be closed, and reversing the direction of rotation of the screw 60 will be effective to move the slide assembly 44 nearer to the pivot pin 22.

Operation of the screw 60 is accomplished by means of the reversible motor 78 through the electromagnetic clutch 80 and universal coupler 84. When there is pressure in the cylinder 46 the switch 96 will be closed, and power is applied to the motor 78 to rotate it in the selected direction which will insert the fuel rod 10 into the reactor 12. Power is also applied to the electromagnetic clutch 80, so that the clutch 80 locks the motor 78 to the screw 60. When it is desired to stop the rotation of the screw 60, the power is removed from both the motor 78 and the magnetic clutch 80 simultaneously. In this manner, the rotational inertia of the motor 78 dissipates itself without further rotating the screw 60, and hence the fuel rod 10 is not moved further within the reactor 12. The fuel rod 10 may be withdrawn from the reactor by merely reversing the direction of the motor 78 and applying power to the motor and the electromagnetic clutch 80. This causes the travelling nut 78 to travel down the screw 60 away from the pivot pin 22 against the air pressure in the cylinder 46, and hence withdraw the fuel rod 10 from the reactor 12.

It is to be noted, that the fuel rod 10 may be moved in either direction by merely rotating the screw 60, when the valve 54 connects the air tank 52 to the portion of the cylinder 46 adjacent to the arm 42 of the slide assembly 44, and hence supplies the power to move the slide assembly 44 toward the pivot pin 22. When the valve 54 is in this position, the other portion of the cylinder 46 assumes atmospheric pressure, since it is exhausted to the atmosphere through the vent 56. This prevents a pressure or vacuum from building up in this portion of the chamber when the piston 48 is moved in the cylinder 46. If it should be desirable to shut down the reactor hurriedly, the valve 54 may be switched to the emergency withdrawal position. In this position, the air tank 52 is connected to the portion of the cylinder 46 farthest from the arm 42 and the portion of the cylinder adjacent to the arm 42 is exhausted to the atmosphere through the vent 56, thus rapidly removing the rod from the reactor 12.

In a particular embodiment of the present invention, the air tank 52 may be operated at an air pressure of between 18 and 20 pounds. The rocker arm 20 may be pivoted at a point 15 inches from the point at which the shaft 36 keys the rocker arm 20 to the slide assembly 44 and to the slots 34. The total length of the rod between the socket 90 and the shaft 36 may be 45 inches. The races 32 in the slide assembly 44 may extend longitudinally about 9 inches and transversely about 2⅜ inches, and slope at an angle of approximately 45° with respect to the tracks 38 on the base 18. Under these conditions, the rod 10 can be removed from the reactor 12 in less than 0.2 second.

It is to be understood that the foregoing disclosure describes but one embodiment of the present invention, and that many other embodiments will occur to the man skilled in the art upon reading this disclosure. For this reason, it is intended that the scope of the invention will be limited only by the appended claims, rather than the specific embodiment herein described.

The following claims set forth what is claimed:

1. A positioning device for positioning an object in a path along a straight line comprising, in combination, a rocker arm, a support member, a pivotal mounting member pivotally attached to the arm and pivotally attached to the support member, the two pivot points being mounted upon a line approximately parallel to the path of the object, and the distance between the two pivot points being relatively great compared to the displacement of the movable pivot point from said line parallel to the path of the object, at least one slide adapted to slide along the support member in a direction parallel to the plane of the rocker arm, said slide being provided with a race angularly positioned relative to the path of the object, the support member being provided with at least one slot having the shape of a portion of an ellipse at the intersection of its major axis and having a major axis equal to twice the length of the rocker arm and a minor axis equal to twice the distance between the slot and the movable pivot point, and a shaft attached to the rocker arm and slidably disposed in the race and the slot.

2. A positioning device for positioning an object along a straight line comprising the elements of claim 1 in combination with a cylinder attached to the support member, a piston and piston rod slidably disposed within the cylinder, said piston rod being parallel to the line of motion of the slide and connected to the slide, and means to apply a gas pressure to either end of the cylinder connected to the cylinder and including a valve having two positions, one position connecting the source of gas pressure to one end of the cylinder and the other position connecting the source of gas pressure to the other end of the cylinder.

3. A positioning device for positioning an object along a straight line comprising the elements of claim 2 in combination with a screw rotatably mounted parallel to the line of motion of the slide, a nut disposed upon the screw, a portion of said nut being in the path of the slide, and means to rotate the screw relative to the nut.

4. A positioning device for positioning an object along a straight line comprising the elements of claim 3 in combination with a gas release valve mounted on the travelling nut including a protruding actuating member positioned to confront the slide, said valve normally being in an open position and closing with insertion of the protruding member into the valve, said valve being connected to one end of the cylinder, whereby the pressure within the cylinder will be released when the valve is in an open position.

5. A positioning device for positioning an object along a straight line comprising the elements of claim 4 in combination with a pressure actuated switch connected to the end of the cylinder to which the gas release valve is connected, and electrically connected to the means for rotating the screw.

6. A positioning device for positioning an object along a straight line comprising, in combination, a base plate, a rocker arm, a pair of parallel support plates attached to the base, a pivotal mounting member pivotally attached to the arm and pivotally attached between the support plates, the two pivot points being mounted upon a line approximately parallel to the path of the object and the distance between the two pivot points being relatively great compared to the displacement of the arm pivot point from a line parallel to the path of the object traversing the pivot point on the support plates, a pair of parallel tracks disposed adjacent to the support plates and mounted upon the base, a pair of parallel slides disposed upon the tracks, said slides being provided with a race angularly positioned relative to the path of the object, each of the parallel support plates being provided with a slot, a shaft attached to the end of the rocker arm and disposed within the slots and the races, the slots having the shape of a portion of an ellipse at the intersection of its major axis, the major axis of said ellipse being equal to twice the length of the rocker arm and the minor axis being equal to twice the distance between the shaft and the arm pivot point, a screw mounted upon the base and rotatable with respect thereto, a nut disposed upon said screw at a point between the slides and a point on the rocker arm adapted to be attached to the object, a cylinder, a piston disposed slidably within the cylinder, a piston rod connected to the piston, mechanical linkage means connected to the slides and to the piston rod for moving the slides in response to motion of the piston, and means for injecting a gas under pressure into the cylinder to move the piston including a source of gas pressure, a two-position valve connected to the source and to both ends of the cylinder, said valve having one position connecting the source to the end of the cylinder remote from the arm pivot point and venting the other end of the cylinder to the atmosphere, and a second position connecting the remote end of the cylinder to the source of pressure and venting the other portion of the cylinder to the atmosphere.

7. A device for positioning an object comprising, in combination, means confining the motion of an object to a straight line, and means to move the object comprising support means, a screw rotatably mounted to the support means, a nut disposed about said screw, said nut being restrained from rotation relative to the support means, a pressure release valve disposed upon said nut, said valve being normally open and having a protruding actuating mechanism, a slide mechanically linked to the means for moving the object and slidably mounted to the support means parallel to the screw, said slide confronting the actuating mechanism of the pressure release valve, a cylinder mounted to the support means, a piston slidably disposed within the cylinder and mechanically linked to the slide, and a source of fluid pressure connected to the cylinder and release valve, whereby the object is actuated only when the release valve abuts the slide and permits the fluid pressure to exert force upon the slide.

8. A positioning device comprising the elements of claim 7 including fluid pressure means independent of the fluid release valve connected to the cylinder to translate the piston in a direction opposite to that of the fluid pressure means incorporating the pressure release valve.

References Cited in the file of this patent

UNITED STATES PATENTS

| | | |
|---|---|---|
| 913,490 | Goble | Feb. 23, 1909 |
| 1,472,730 | Martin | Oct. 30, 1923 |
| 1,549,944 | Wilkinson | Aug. 18, 1925 |
| 1,662,087 | Thomas et al. | Mar. 13, 1928 |
| 1,904,716 | Biggs | Apr. 18, 1933 |
| 2,367,492 | Fickett et al. | Jan. 16, 1945 |
| 2,450,111 | Brosemer | Sept. 28, 1948 |